(12) United States Patent
Wither (10) Patent No.: US 12,398,711 B1
(45) Date of Patent: Aug. 26, 2025

(54) ARCHIMEDES GRAVITY ENERGY PUMP

(71) Applicant: Thomas A Wither, Royal Oaks, MI (US)

(72) Inventor: Thomas A Wither, Royal Oaks, MI (US)

( * ) Notice: Subject to any disclaimer, the term of this patent is extended or adjusted under 35 U.S.C. 154(b) by 0 days.

(21) Appl. No.: 18/667,639

(22) Filed: May 17, 2024

(51) Int. Cl.
| F04B 17/00 | (2006.01) |
| C02F 1/44 | (2023.01) |
| F03G 3/00 | (2006.01) |
| F03G 3/08 | (2006.01) |
| F03G 6/00 | (2006.01) |

(52) U.S. Cl.
CPC ............ *F04B 17/006* (2013.01); *F03G 3/087* (2021.08); *F03G 6/001* (2013.01); *F03G 6/0055* (2021.08); *F03G 6/089* (2021.08); *C02F 1/441* (2013.01)

(58) Field of Classification Search
CPC .... F04B 17/006; F04B 47/022; F04B 47/028; F03G 3/087; F03G 3/08; F03G 6/001; F03G 6/0055; F03G 6/089; F03G 7/081; F03G 7/08; C02F 1/441; H02K 7/1853; H02K 7/025; H02S 10/10; H02S 10/20; E21B 43/127
See application file for complete search history.

(56) References Cited

U.S. PATENT DOCUMENTS

| 7,001,157 | B2* | 2/2006 | Xiaoxi | F04B 47/02 417/415 |
| 9,127,640 | B2* | 9/2015 | Rohrer | F03B 13/14 |
| 9,429,001 | B2* | 8/2016 | Best | F04B 1/146 |
| 9,896,916 | B2* | 2/2018 | Ferrari | H02J 3/381 |
| 9,970,420 | B2* | 5/2018 | Wang | F04B 47/022 |
| 10,422,205 | B2* | 9/2019 | Doyle | F04B 47/02 |
| 11,921,479 | B2* | 3/2024 | Valin | H02S 10/10 |
| 12,016,486 | B2* | 6/2024 | Cohen | A47J 36/32 |
| 2014/0097617 | A1* | 4/2014 | Rohrer | F03B 13/182 290/42 |

* cited by examiner

Primary Examiner — Dapinder Singh
(74) Attorney, Agent, or Firm — NYLS Patent Law Clinic (57) ABSTRACT

A gravity-driven energy pump apparatus and method for reverse osmosis desalination utilizing the gravitational force of an electrified weight-bearing vehicle. Comprised of upright support stanchion posts, an axle, and a linear track with protective end stops located on opposite ends. Wherein the central section of the track is affixed to the axle, enabling rotation when gravitational force is applied, thus tilting the opposite side on the axle. Further comprises an electrified weight-bearing vehicle (EWBV) positioned atop the track allowed to move back and forth, exerting gravitational force and inducing rotation. A solar PV array is affixed to the top of the EWBV to generate solar energy to power the battery. Chains affixed to both ends of the track catch the falling weight of the track. The action rotates drive and pinion gears to push pistons into pressure cylinders, facilitating fluid pumping between pressure cylinders and a pre-filtered water reservoir.

9 Claims, 8 Drawing Sheets

ARCHIMEDES GRAVITY ENERGY PUMP

BACKGROUND OF THE INVENTION

Climate change has a significant impact on the dynamics of global water resources. Increasing concerns about global warming and pollution have shown the importance of maintaining a reliable fresh water source. Millions of individuals rely on freshwater in various aspects of their daily routine. In many regions, contamination has rendered traditional freshwater sources unsuitable. Rising sea levels, resulting from melting ice caps, has specifically exacerbated saltwater intrusion into freshwater sources in coastal areas. There is a pressing need to supplement the freshwater sources to ensure reliable and consistent access to water.

Reverse osmosis water purification is one of the most popular methods of water purification today. In typical reverse osmosis systems, a water supply containing unwanted contaminants is forced at a high pressure through a specialized membrane that allows water molecules to pass through while blocking passage of larger contaminants. During this process, the contaminants are filtered out and flushed away, leaving clean drinking water. While the primary purpose of most desalination plants is to provide a reliable source of fresh water in regions facing water scarcity, they also come with a diverse application for industrial water needs.

The high energy consumption of modern reverse osmosis desalination technology is a significant barrier to many areas in need of such technology. The substantial energy input comes mainly from pumping the seawater through the membranes with high pressure. Typically, large-scale high-pressure pumping and injection systems, or artificial lifts are utilized to perform the pressurization and pumping process. This energy intensive operation contributes to high operating costs and increased greenhouse gas emissions but is essential to reverse osmosis desalination.

Advancements aimed at reducing energy consumption in desalination plants have fallen short. Hybrid desalination systems have been developed to rely on both conventional energy sources and renewable energy. These systems remain partially dependent on grid electricity and nevertheless require substantial energy output to effectively operate. Therefore, there exists a need for a fully self-sustaining fluid pumping and lifting system that is dependent on renewable energy.

SUMMARY OF THE INVENTION

The envisioned invention overcomes the energy intensity and environmental damage by incorporating a self-contained solar electric vehicle to operate a gravity-based pumping and artificial lift system. This eliminates the need for grid power and removes prohibitive costs of energy for reverse osmosis desalinization projects.

The present disclosure relates generally to a self-contained solar and gravity-based fluid pumping and artificial lift system that utilizes the gravitational force of an electrified weight bearing vehicle (EWBV) to power a reciprocating pump system capable of desalination by reverse osmosis with minimal energy input from the EWBV. The system provides an inexpensive solution for harnessing solar and gravitational energy to substantially reduce energy consumption during large scale pumping or extraction of fluids. In one embodiment, the system generates clean energy for the reverse osmosis desalination process with zero GHG emissions.

The present invention comprises of a roadway platform, wherein the platform comprises a track having at least two spring-loaded end stops located on opposite ends of the roadway platform; an electrified weight bearing vehicle (EWBV) positioned on top of the roadway platform capable of moving back and forth on the platform, wherein the back-and forth movement of the EWBV is limited by the spring-loaded end stops. A solar photovoltaic (PV) array is affixed atop the EWBV to power the battery attached to the EWBV. An axle is centered between the support structure and the bottom of the platform to facilitate up and down movement. Left and right platform stops attached to the support structure can limit the platform to at least a twenty degree drop in both directions.

An electrified weight bearing vehicle (EWBV) functions as the prime mover. The movement of the EWBV induces a reciprocal motion by the roadway platform. In one exemplary embodiment, the chain is connected to the inferior portion of a minimum of two drive gears such that the motion of the chain rotates the drive gear, wherein each drive gear being coupled to at least one pinion gear, and wherein at least one drive gear is located on the left side of the apparatus and at least one drive gear is located on the right side of the apparatus. In one embodiment, the gravity energy pump apparatus has a minimum of two horizontal flat racks, each rack being affixed to at least one piston, wherein at least one horizontal flat rack is located on the left side of the apparatus and at least one horizontal flat rack is located on the right side of the apparatus. When the gravitational pump apparatus is in motion each horizontal flat rack is connected to the inferior portion of the pinion gear such that the rack converts the rotational motion of the pinion gear into linear motion.

In one embodiment, during a one-minute desalination cycle the EWBV draws energy for a total of four seconds and remains at rest for the remaining fifty-six seconds. The system harnesses solar and gravitational energy to significantly offset energy consumption during high-pressure fluid pumping and extraction. The EWBV moves along the roadway platform through the chain catching the gravitational effect of the roadway platform against the weight of the EWBV. The falling force utilizes gravitational energy to enable the EWBV to travel back-and-forth on the roadway platform. The chain catches the weight of the EWBV and its movement on the roadway platform to rotate the gears and generate energy.

In one embodiment, a pre-filtered water reservoir comprised of a pre-filtered water inflow pipe, a minimum of two outlet pipes each comprising at least one inferior flap gate, a pressure cylinder having at least one discharge pipe, having a superior flap gate, wherein the flap gates allow fluid to move in a distal direction from the pre-filtered water inflow into the pressure cylinder, where each pressure cylinder contains at least one piston, wherein when the gravity apparatus is in motion the piston alternates between pressure differentials and forcing fluid out of the chamber and in the direction of the superior flap gate and through the reverse osmosis membrane stack.

The system has applicable uses in multiple industries. In some embodiments the present invention may be utilized for municipal fresh and wastewater systems, new hydroelectric pumped storage, enhanced geothermal carbon capture and storage, ocean thermal energy conversion, and sustainably extracting white/natural hydrogen or oil.

In one embodiment, a quay crane motor may pull up to 315,000 pounds to move the EWBs back and forth. The back-and-forth motion produces hundreds of thousands of pounds of pressure and GPM. Maximizing output through this motor makes it applicable for use with extremely large-scale pumping and artificial lift systems.

One aspect of the present disclosure is directed to a gravitational pumping apparatus for pumping saline fluid, comprising: (a) One or more upright support stanchion posts affixed to an axle; (b) At least one linear track having at least two spring loaded end stops located on opposite ends of the track; wherein the linear track has a left side and a right side; and wherein the center of the linear track is affixed to the superior portion of the axle such that the linear track can rotate around the axle when a gravitational force is exerted upon one distal end of the linear track; and wherein when a gravitational force is exerted on one side of the linear track the opposite side lifts along the axis; (c) an electrified weight bearing vehicle positioned on top of the linear track and allowed to move back and forth on the track, wherein the electrified weight bearing vehicle being comprised of an EV chassis, a battery, and a solar photovoltaic array; wherein the back-and-forth movement of the electric chassis is limited by the spring-loaded end stops; and wherein the back-and-forth movement of the electrified weight bearing vehicle along the track exerts a gravitational force on one end of the linear track such that the track rotates around the axle; (d) a single chain having a left end and a right end; wherein the left end of the chain is affixed to the left distal side of the linear track, and the right end of the chain is affixed to the right distal side of the linear track; (e) a minimum of two chain drive gears, each chain drive gear being coupled to at least one pinion gear; wherein at least one chain drive gear is located on the left side of the apparatus and at least one chain drive gear is located on the right side of the apparatus; and wherein the chain is connected to the inferior portion of the chain drive gears such that the motion of the chain rotates the chain drive gear; (f) A minimum of two horizontal flat racks, each rack being affixed to at least one piston; wherein at least one horizontal flat rack is located on the left side of the apparatus and at least one horizontal flat rack is located on the right side of the apparatus; wherein when the gravitational pump apparatus is in motion each horizontal flat rack is connected to the inferior portion of the pinion gear such that the rack converts the rotational motion of the pinion gear into linear motion; and (g) A pre-filtered water reservoir comprised of a pre-filtered water inflow pipe, a minimum of two outlet pipes each comprising at least one inferior flap check valve, a pressure cylinder having at least one discharge pipe, having a superior flap check valve and a reverse osmosis membrane stack; wherein the flap check valves allow fluid to move in a distal direction from the pre-filtered water inflow into the pressure cylinder; wherein each pressure cylinder contains at least one piston; wherein when the gravity apparatus is in motion the piston alternates between creating pressure differentials and forcing fluid out of the chamber in the direction of the superior flap check valve and through a reverse osmosis membrane stack.

In one embodiment, the upright support stanchion posts have stops affixed to either side of the superior portion of the stanchion posts, limiting the rotational movement of the linear track to a maximum decline angle. In another embodiment, the EV chassis is powered by one or more EV batteries. In one embodiment, the batteries are recharged using one or more solar PV panels coupled to the top of the EV chassis. In another embodiment, the back-and-forth movement of the EV chassis between the spring-loaded stops on the track allows the EV batteries to remain charged.

Another aspect of the present disclosure is directed to a method for desalination of fluid composing: (a) using a pre-filtered water reservoir comprising, an inflow pipe, a minimum of two outlet pipes, and having a left and right side and containing saline fluid; wherein at least one outlet pipe is affixed to the left side of the reservoir, and wherein at least one outlet pipe is affixed to the right side of the reservoir; and wherein each outlet pipe further comprises an inferior flap check valve, a pressure cylinder, and a superior flap check valve; and a minimum of one reverse osmosis membrane stack; (b) utilizing the gravitational force of an electric weight bearing vehicle on one end of a linear track to rotate the linear track on an axel supported by one or more stanchion posts; and wherein the electric weight bearing vehicle further comprises an EV chassis, a battery, and a photovoltaic array; and wherein the photovoltaic array charges the battery; and wherein the battery sustains the movement of the electric weight bearing vehicle; (c) using the motion of a chain attached to each end of the linear track to rotate a minimum of two chain drive gears coupled to a minimum of one pinion gear; wherein at least one chain drive gear is affixed to the left side of the linear track, and wherein at least one chain drive gear is affixed to the right side of the linear track; and wherein each pinion gear is connected to a flat rack such that the rotation of the pinion gear with the flat rack converts the rotational motion of the pinion gear into a linear motion of the flat rack; and wherein each flat rack is connected to a minimum of one piston, which is encircled by at least one pressure cylinder; and (d) using the reciprocating motion of the left and right pistons to create pressure differentials in the pressure cylinders; and wherein the pressure differential draws the saline fluid from the pre-filtered water reservoir, through the inferior flap check valve, into the pressure cylinder, and through the superior flap check valve, to exit the apparatus through the reverse osmosis membrane stack; and wherein the flap check valves oscillate between an open and closed position dependent upon the pressure differential of the cylinder; and wherein fluid flowing towards the reverse osmosis membrane stack opens the flap check valve; and wherein fluid flowing away from the reverse osmosis membrane stack closes the flap check valve in a reciprocating motion.

In one embodiment, the upright support stanchion posts have stops affixed to either side of the superior portion of the stanchion posts, limiting the rotational movement of the linear track to a maximum decline angle. In another embodiment, the EV chassis is powered by one or more EV batteries. In yet another embodiment, the batteries are recharged using one or more solar PV panels coupled to the top of the EV chassis.

BRIEF DESCRIPTION OF THE DRAWINGS

The invention may best be understood by reference to the following description taken in conjunction with the accompanying drawings, in the several figures of which like reference numbers identify the like elements and in which.

DETAILED DESCRIPTION

The present invention is directed to a high-pressure pumping and injecting, or artificial fluid lift system powered by solar or gravity-based energy.

A description of embodiments of the present disclosure will now be given with reference to the figures. It is expected that the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

Before any embodiments of the invention are explained in detail, it is to be understood that the disclosure is not limited in its application to the details of construction nor to the arrangement of components set forth in the following description or illustrated in the drawings. The disclosure is capable of other embodiments and of being practiced or of being carried out in various ways.

With reference now to the drawings, and in particular to FIGS. 1 through 8 thereof, a gravity energy pump apparatus embodying the principles and concepts of an embodiment of the disclosure will be described.

Figure 1:
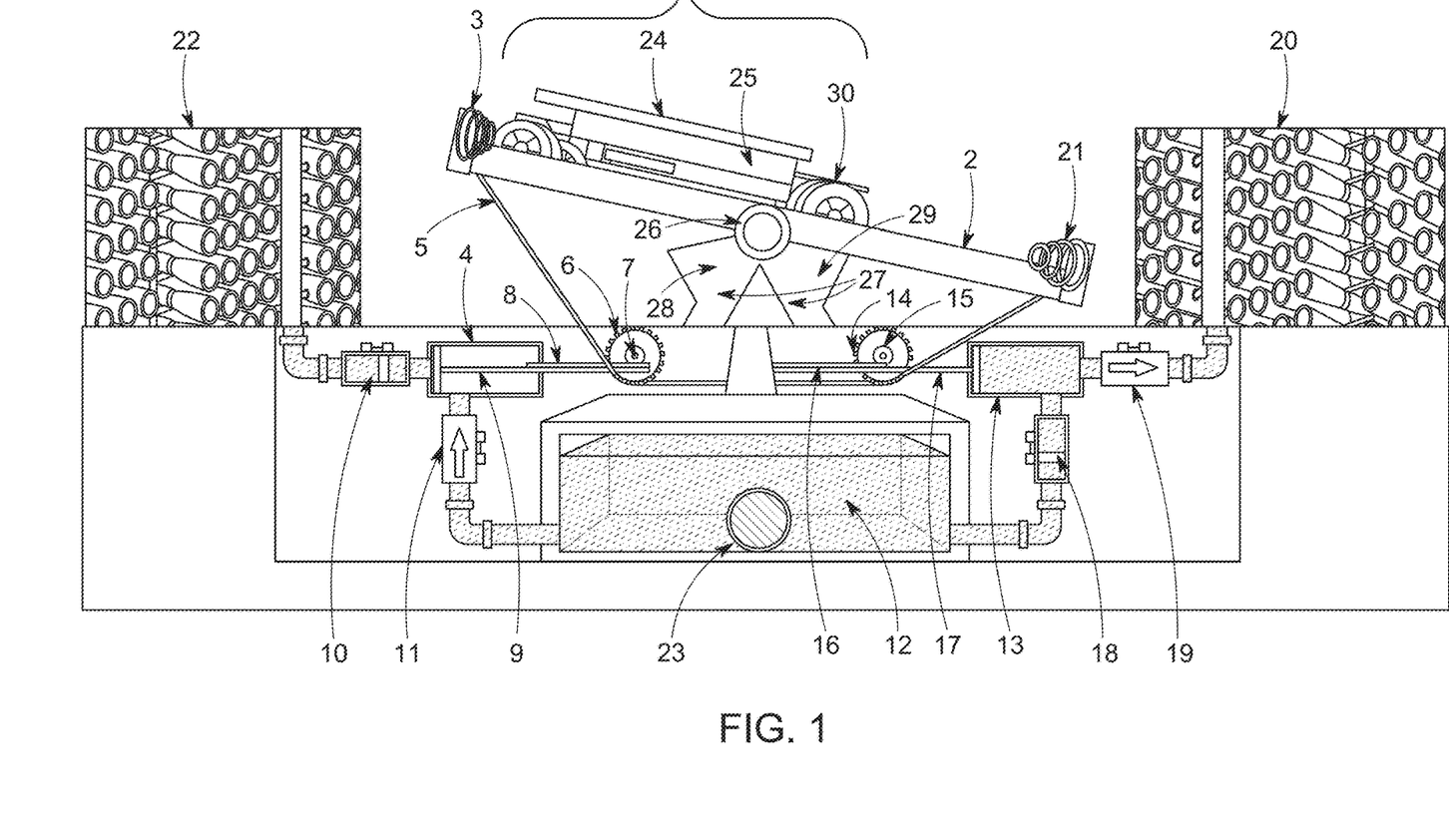
FIG. 1 sets forth a layout view of an embodiment of the apparatus, according to one embodiment of the invention at the beginning of a pumping cycle.

As demonstrated in FIG. 1, a left spring-loaded stop (3) and right spring-loaded stop (21) are located at each end of a linear track (2). The linear track (2) is positioned on top of at least two stanchion posts (27). A left platform stop (28), and right platform stop (29) are located on opposing sides of the stanchion posts (27). In most embodiments, the linear track (2) is approximately eighteen feet in length. An axle (26) is positioned in the center between the top of the stanchion posts (27) and the linear track (2) to allow movement of the linear track (2). In most embodiments, the left platform stop (28) and right platform stop (29) are positioned to restrict the linear track (2) from moving more than twenty degrees in either direction. The electrified weight bearing vehicle (EWBV) (1) is positioned atop the linear track (2). The EWBV further comprises an EV Chassis (30), a battery (25) and a solar PV array (24) wherein the battery (25) is affixed to the EV Chassis (30) and the solar PV array (24) is located on top of the battery (25) and is positioned upwards. In one embodiment, the battery (25) converts solar power harnessed by the solar PV array (24) to power the EWBV (1).

As shown in FIG. 1 through FIG. 8, a chain (5) is affixed to the lower exterior end of the linear track (2). On the left side of the apparatus, the chain (5) connects to a left chain drive gear (6) which is attached to the left pinion gear (7). The left chain drive gear (6) and left pinion gear (7) being fixed to one another and attached to a left horizontal flat rack (8). The left horizontal flat rack (8) is positioned on top of the left piston (9) wherein the rotation of the left chain drive gear (6) and left pinion gear (7) along the horizontal flat rack (8) converts the rotational energy from the left chain drive gear (6) into a linear energy. A left pressure cylinder (4) is attached at the end of the left piston (9).

On the right side of the apparatus, the chain (5) connects to a right chain drive gear (14) which is fixed to a right pinion gear (15). The right chain drive gear (14) and right pinion gear (15) being connected to a right horizontal flat rack (16). The right horizontal flat rack (16) being positioned on top of the right piston (17) and affixed to it such that the rotation of the right chain drive gear (14) and right pinion gear (15) along the horizontal flat rack (16) converts the rotational energy from the right chain drive gear (14) into linear energy. A right pressure cylinder (13) is attached at the end of the right piston (17). A pre-filtered water reservoir (12) is between the left pressure cylinder (4) and the right pressure cylinder (13). A pre filtered water inflow pipe (23) adjoins the pre filtered water reservoir (12) to allow fluid to flow. In one embodiment, the pre filtered water reservoir (12) should be adapted to be capable of accommodating significant fluid volumes.

An inferior left flap check valve (11) is within the outlet piping that connects the left pressure cylinder (4) and the pre-filtered water reservoir (12). A superior left flap valve (10) is positioned in the outlet piping, connecting the left pressure cylinder (4) and the left reverse osmosis membrane stack (22), only allowing the saline water to travel away from the left pressure cylinder (4). An inferior right flap check valve (18) is in the outlet piping that connects the right pressure cylinder (13) and the pre-filtered water reservoir (12) and only permits the saline water to transfer away from the pre-filtered water reservoir (12). A superior right flap valve (19) connects the outlet piping between the right pressure cylinder (13) and the right reverse osmosis membrane stack (20).

As shown in FIG. 1 through FIG. 8, reverse osmosis membrane stacks (20, 22) are located on either side of the apparatus. The right reverse osmosis membrane stack (20) is attached to outlet piping by the right pressure cylinder (13) to allow for fluid transfer through pumping. The left reverse osmosis membrane stack (22) is attached by outlet piping to the left pressure cylinder (4) to further facilitate the fluid transfer. In one embodiment, the reverse osmosis membranes (20, 22) may be semi-permeable to facilitate the filtering of water molecules from salt and other impurities.

In one embodiment the right pressure cylinder (13) and left pressure cylinder (4) should be capable of accommodating significant fluid volumes. In some embodiments the system may use seawater or brackish water as the fluid source. Brackish water is a substantial but underutilized water source that may reduce reliance on traditional fresh water sources. Brackish water contains a lower salinity level than seawater making it a viable fluid source for reverse osmosis desalination. Typical prime movers of pumping systems generate hundreds of metric tons of greenhouse gas emissions per year due to their energy output.

As demonstrated in FIG. 1 through 8, the EWBV (1) functions as the prime mover and requires minimal energy.

FIG. 1 through FIG. 8 demonstrate a one-minute-long reverse osmosis desalination cycle conducted with the presently disclosed system.

FIG. 1 demonstrates the beginning of a pumping cycle. As shown, the EWBV (1) is positioned at the left end of the linear track (2) touching the left spring-loaded stop (3). In this position, the superior left flap check valve (10) and the inferior right flap check valve (18) are in a closed position. The inferior left flap check valve (11) and the superior right flap check valve (19) are in an open position. The right pressure cylinder (13) being full of saline fluid and the left pressure cylinder (4) being empty of any fluid.

Figure 2:
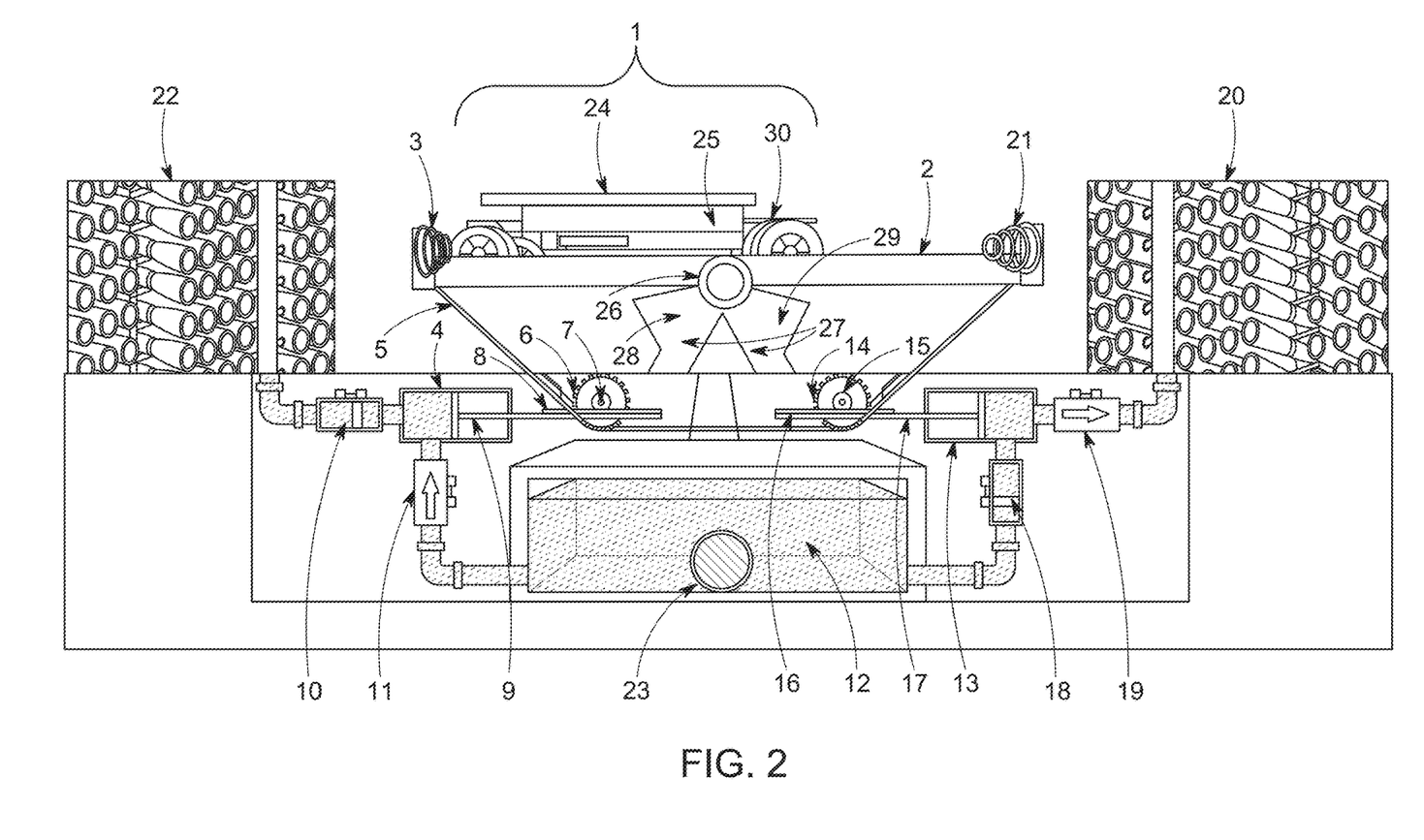
FIG. 2 exemplary illustrates a layout view of an embodiment of the apparatus, where the linear track is in a horizontal resting position.

As shown in FIG. 2, the gravitational weight of the EWBV (1) then rotates the linear track (2) around the axel (26) into a horizontal position. In one embodiment, this occurs for approximately fourteen seconds of the pumping cycle and requires no energy input. The motion moves the chain (5) to fifty percent of its range. The chain (5) movement rotates the left chain drive gear (6). The rotation of the left chain drive gear (6) rotates the left pinion gear (7). Then, the left horizontal flat rock (8) and attached left piston (9) are drawn halfway back into the left pressure cylinder (4). The motion of the fluid closes the superior left flap check valve (10) and opens the inferior left flap check valve (11). The pressure differential created from the left piston's (9) motion within the left pressure cylinder (4) allows fluid to be drawn from the prefiltered water reservoir (12) through the opening of the inferior left flap check valve (11) to fill the available space in the left pressure cylinder (4).

As demonstrated in FIG. 2, the chain (5) movement rotates the right chain drive gear (14), thus turning the right pinion gear (15). The right horizontal flat rack (16) and attached right piston (17) are pushed halfway into the right pressure cylinder (13). This action closes the inferior right flap check valve (18) and opens the superior right flap check valve (19), pushing fluid from the right pressure cylinder (13) into the right reverse osmosis membrane stack (20) at a force of 1,000 PSI for seawater, or a force of 400 PSI for brackish water.

Figure 3:
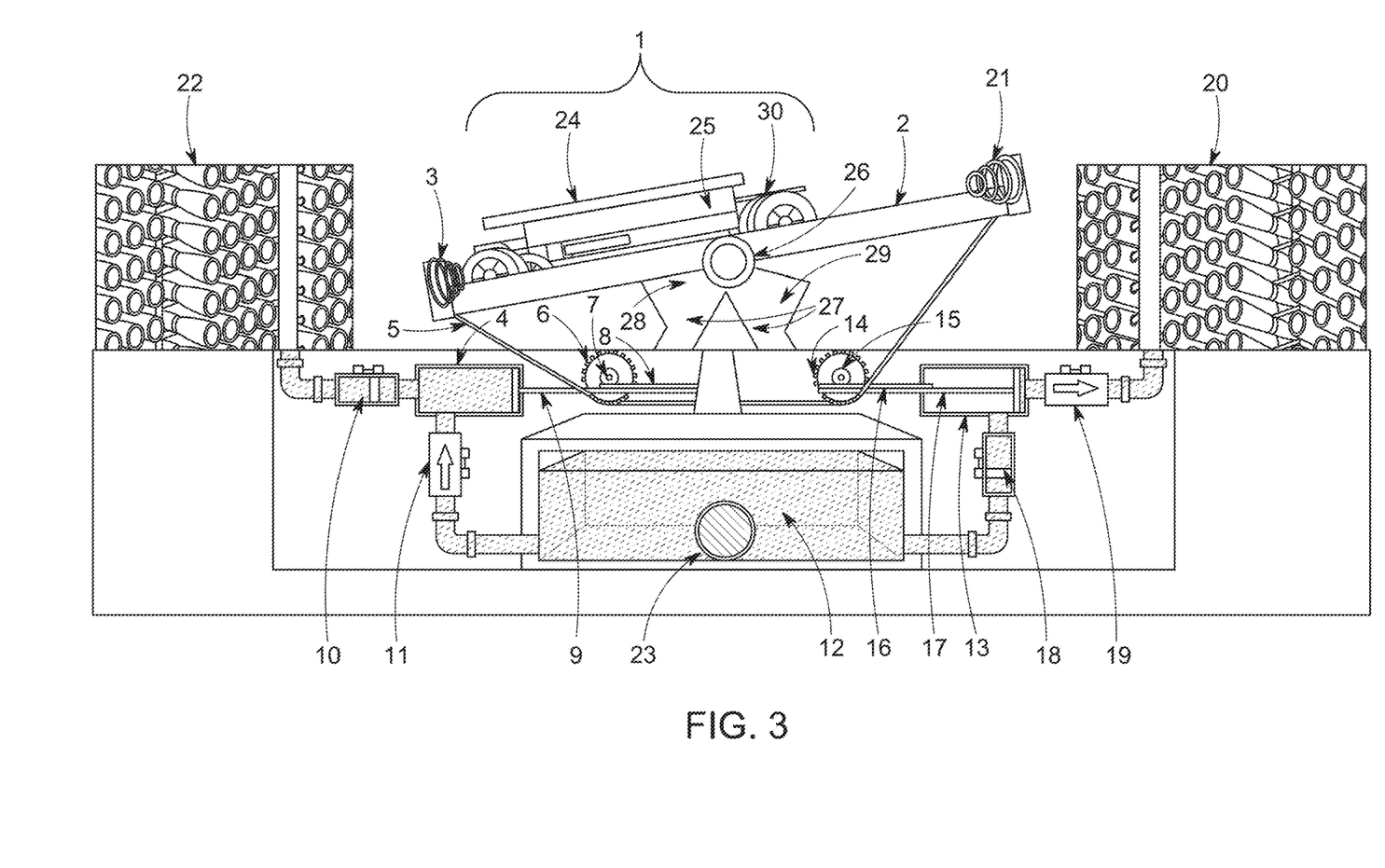
FIG. 3 exemplary illustrates a layout view of an embodiment the apparatus, where the EWBV rests on the left side of the linear track and the right pinion is drawn fully into the right pressure cylinder.

As demonstrated in FIG. 3, during fluid pumping, the gravitational weight of the EWBV (1) rotates the linear track (2) around the axel (26) to rest atop the left platform stop (28). One embodiment has the left platform stop (28) at a twenty-degree angle. In one embodiment, this motion occurs for approximately twenty-eight seconds and requires no energy input. The rotation of the linear track (2) moves the chain (5) to one hundred percent of its range. The chain (5) movement rotates the left chain drive gear (6). The left chain drive gear (6) then rotates the left pinion gear (7). The left horizontal flat rack (8) and attached left piston (9) are fully drawn back into the left pressure cylinder (4) allowing the saline fluid to fill the entire area of the left pressure cylinder (4). Due to the pressure differentials created by the motion of the piston (9) within the pressure cylinder (4), the superior left flap check valve (10) closes, as the saline is pulled away from the valve and then the inferior left flap check valve (11) opens, allowing fluid to be drawn from the pre filtered water reservoir (12) to fully refill the left pressure cylinder (4).

As further demonstrated in FIG. 3, the chain (5) movement rotates the right chain drive gear (14), which rotates the right pinion gear (15). The right horizontal flat rack (16) and attached right piston (17) are fully pushed into the right pressure cylinder (13) and expelling any saline within the cylinder (13). This pressure differential created by the motion of the right piston (17) closes the inferior right flap check valve (18) as there is no pressure suctioning the fluid through the valve (18). The motion of the saline fluid then opens the superior right flap check valve (19), pushing fluid from the right pressure cylinder (13) into the right reverse osmosis membrane stack (20).

As further demonstrated in FIG. 3, the reverse osmosis membrane stack (20) is a collection of semipermeable membranes that allow the passage of water molecules through the membrane while filtering out most dissolved salts, organics, bacteria and pyrogens within the fluid. When the piston pushes the saline through the superior flap check valve (19) and through the reverse osmosis membrane stack (20) the membrane filters the saline into potable water.

Figure 4:
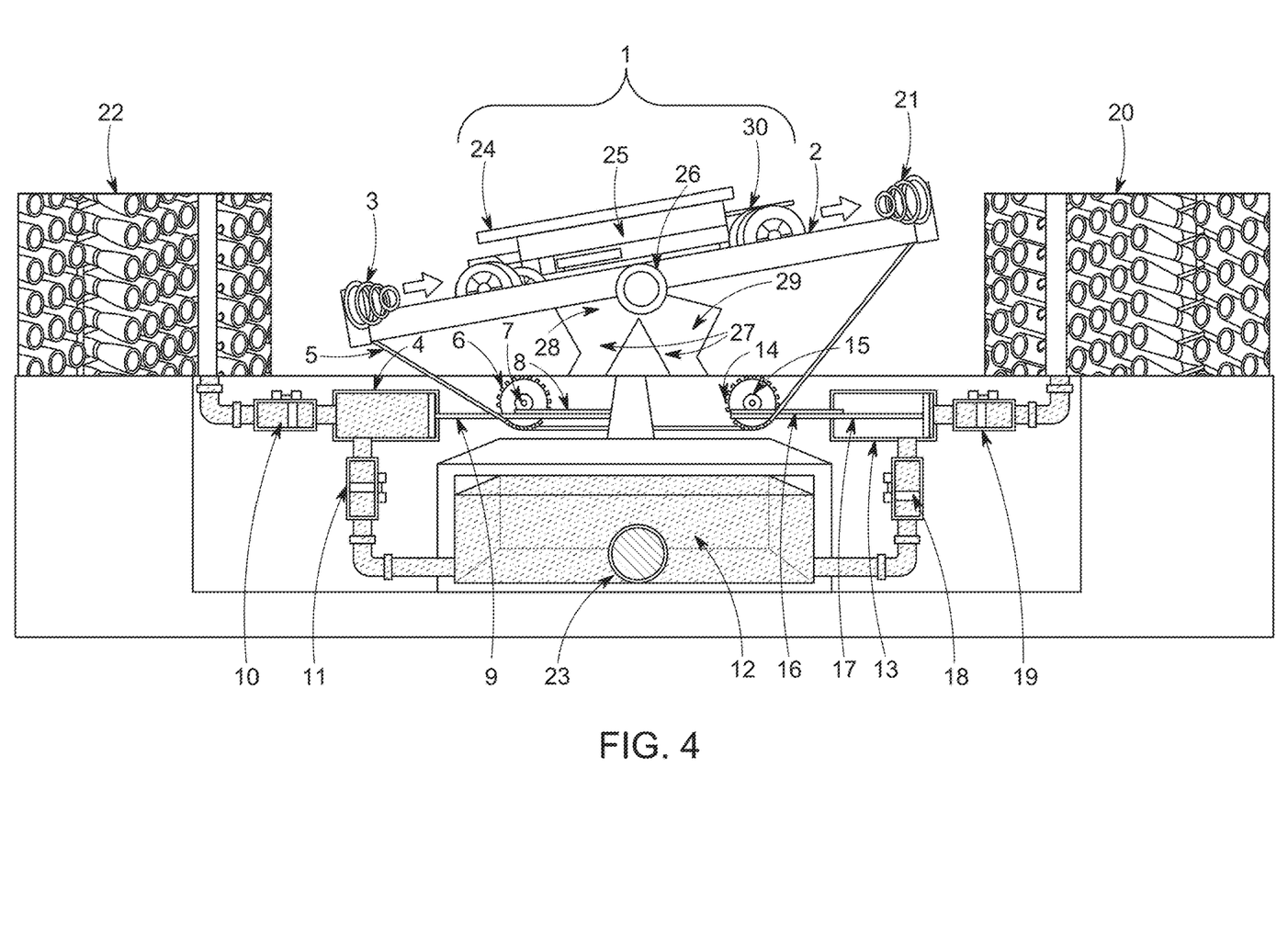
FIG. 4 exemplary illustrates a layout view of an embodiment of the apparatus, where the EWBV has traveled fifty percent of the length of the linear track and the flap check valves are closed.

FIG. 4 demonstrates a two second pause of the high-pressure pumping cycle. The left spring-loaded stop (3) releases, allowing the EWBV (1) to move halfway up the linear track (2). The EWBV (1) draws energy for these two seconds and all other components remain at rest. The inferior right flap check valve (18), superior right flap check valve (19), superior left flap check valve (10), and inferior left flap check valve (11) are closed.

Figure 5:
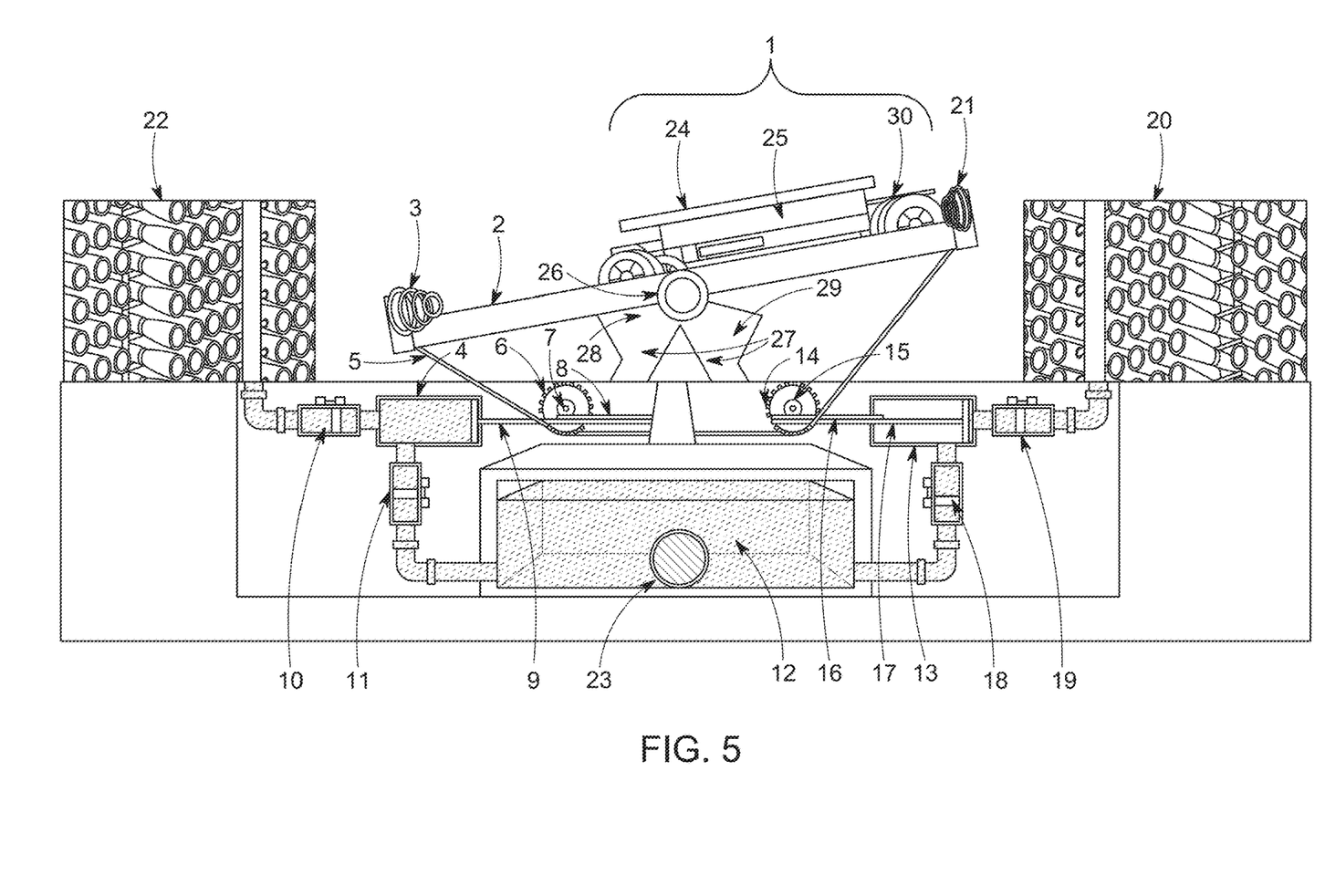
FIG. 5 exemplary illustrates a layout view of an embodiment of the apparatus, where the EWBV has traveled the full length of the linear track.

FIG. 5 demonstrates an additional two second pause during the high-pressure pumping cycle, following the pause depicted in FIG. 4. The EWBV (1) travels completely up the incline of the linear track (2) during this pause. The EWBV (1) draws energy from the battery (25) for the total four second pause, including the pause of FIG. 4, and all other components remain at rest. The inferior right flap check valve (18), superior right flap check valve (19), inferior left flap check valve (11), and superior left flap check valve (10) remain closed.

Figure 6:
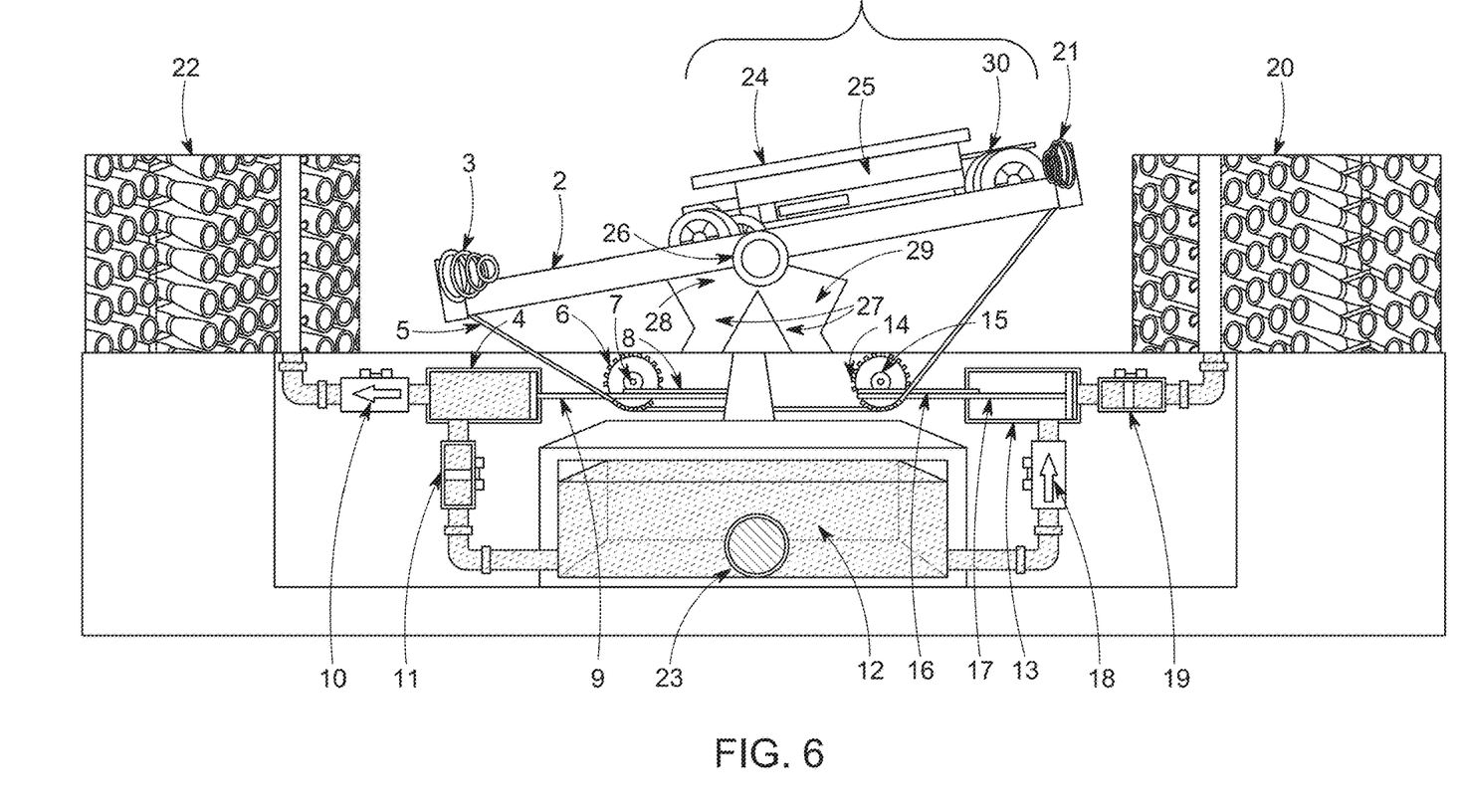
FIG. 6 exemplary illustrates a layout view of an embodiment of the apparatus, where the EWBV has traveled the full length of the linear track, and the flap check valves are open.

FIG. 6 demonstrates the pumping cycle before it resumes movement, with the EWBV (1) positioned at the right end of the linear track (2). The EWBV touches the right spring-loaded stop (21) in this position. All components of the system are at rest and are using no energy.

Figure 7:
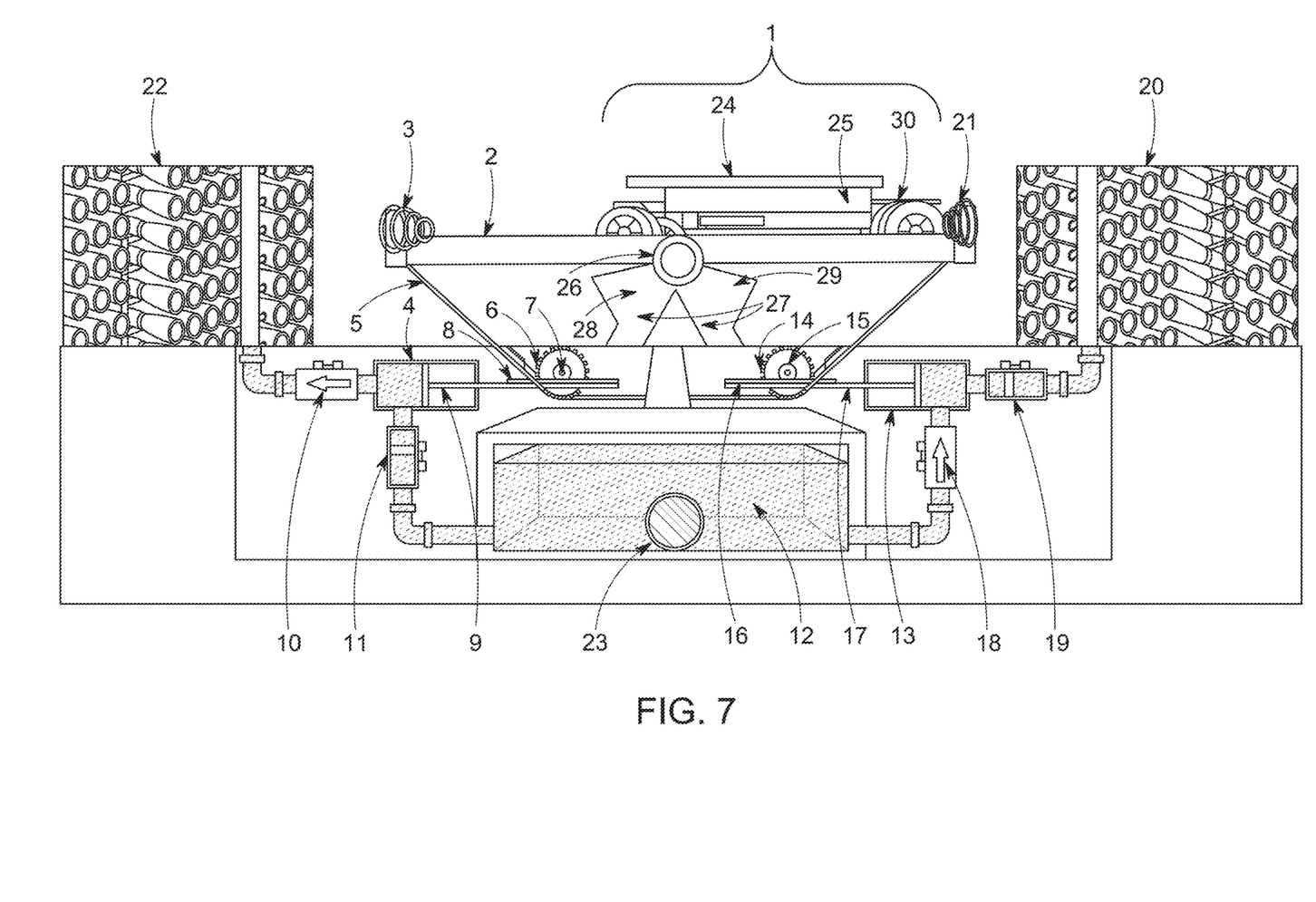
FIG. 7 exemplary illustrates a layout view of an embodiment of the apparatus, where the linear track is in a horizontal position.

As shown in FIG. 7, the pumping cycle then resumes with the gravitational weight of the EWBV (1) rotating the linear track (2) into a horizontal position. In one embodiment, this motion occurs for about fourteen seconds and with zero energy input. The rotating of the linear track (2) moves the chain (5) to about fifty percent of its range. The chain's (5) movement rotates the left chain drive gear (6). The rotation of the left chain drive gear (6) rotates the left pinion gear (7). Then, the left horizontal flat rock (8) and attached left piston (9) are pushed halfway into the left pressure cylinder (4). The action closes the inferior left flap check valve (11) and opens the superior left flap check valve (10). The opening of the superior left flap check valve (10) allows fluid to flow due to the pressure of fluid from the left pressure cylinder (4) into the left reverse osmosis membrane stack (22).

FIG. 7 then demonstrates the chain (5) movement rotating the right chain drive gear (14), which turns the right pinion gear (15). The right horizontal flat rack (16) and attached right piston (17) are drawn halfway back into the right pressure cylinder (13). This action opens the inferior right flap check valve (18) and closes the superior right flap check valve (19), allowing fluid to be drawn from the pre filtered water reservoir (12) to refill the right pressure cylinder (13) halfway.

Figure 8:
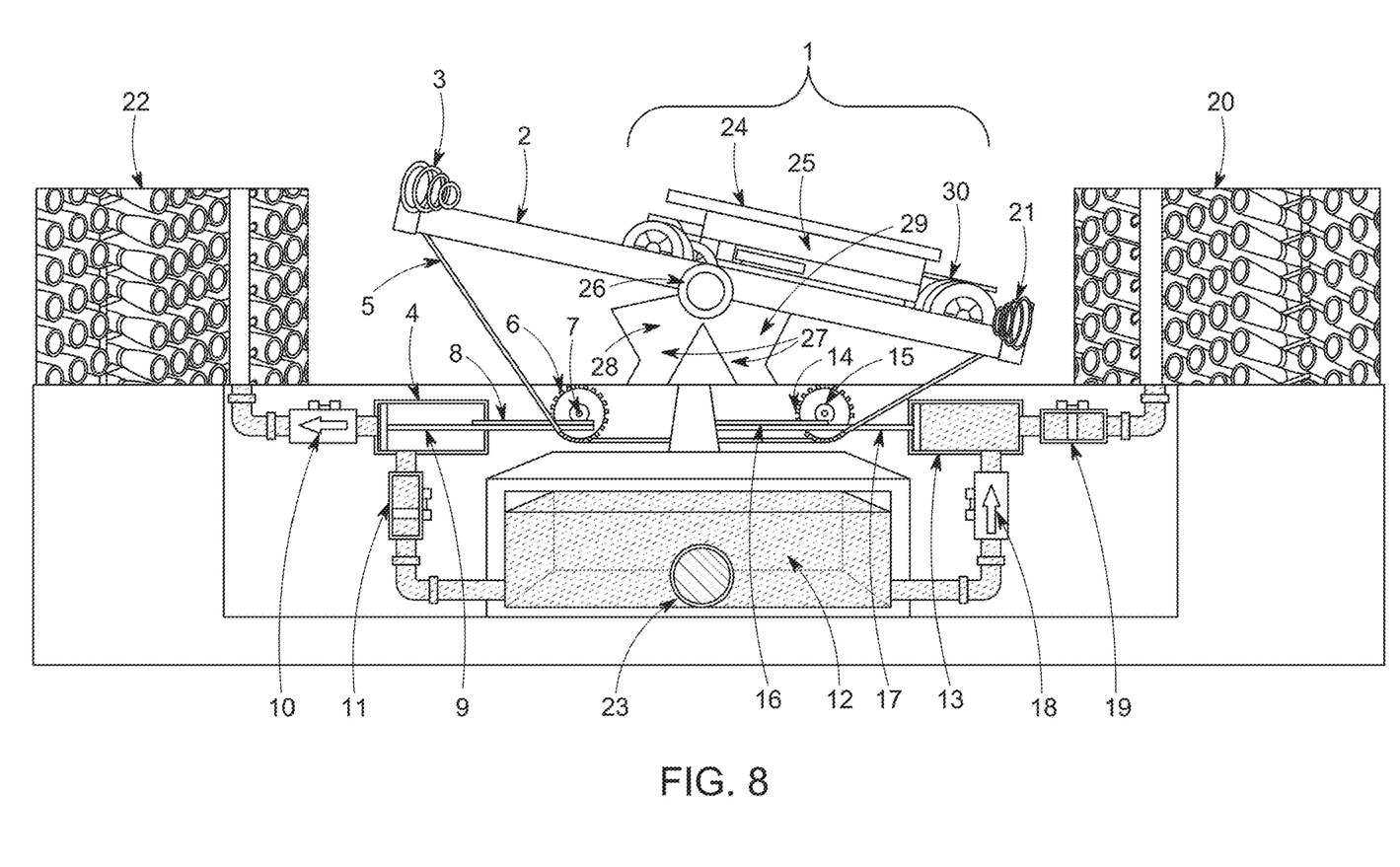
FIG. 8 exemplary illustrates a layout view of an embodiment of the apparatus, where the EWBV rests on the right side of the linear track and the left pinion gear is drawn fully into the left pressure cylinder.

FIG. 8 demonstrates the end of the approximately one-minute-long reverse osmosis desalination cycle. The weight of the EWBV (1) has rotated the linear track (2) around the axel (26) to a twenty-degree angle against the right platform stop (29). The linear track (2) rests on the right-side spring-loaded stop (21), thus completing the sixty second cycle.

The linear track (2) rotating moves the chain (5) to one hundred percent of its range. This movement of the chain (5) rotates the left chain drive gear (6). The left chain drive gear (6) then rotates the left pinion gear (7). The left horizontal flat rack (8) and attached left piston (9) are pushed fully into the left pressure cylinder (4). This action keeps the inferior left flap check valve (11) closed and then opens the superior left flap check valve (10), pushing fluid from the left pressure cylinder (4) into the left reverse osmosis membrane stack (22).

The chain (5) movement also rotates the right chain drive gear (14), which rotates the right pinion gear (15). The right horizontal flat rack (16) and attached right piston (17) are fully drawn back into the right pressure cylinder (13). The superior right flap check valve (19) closes, and the inferior right flap check valve (18) remains open, allowing fluid to be drawn from the pre filtered water reservoir (12) to fully refill the left pressure cylinder (13).

The invention claimed is:

1. A gravitational pumping apparatus for pumping saline fluid, comprising:
   One or more upright support stanchion posts affixed to an axle;
   At least one linear track having at least two spring loaded end stops located on opposite ends of the track;
      Wherein the linear track has a left side and a right side; and
      Wherein the center of the linear track is affixed to the superior portion of the axle such that the linear track can rotate around the axle when a gravitational force is exerted upon one distal end of the linear track; and
      Wherein when a gravitational force is exerted on one side of the linear track the opposite side lifts along the axis;
   An electrified weight bearing vehicle positioned on top of the linear track and allowed to move back and forth on the track, wherein the electrified weight bearing vehicle being comprised of an EV chassis, a battery, and a solar photovoltaic array;
      Wherein the back-and-forth movement of the electric chassis is limited by the spring-loaded end stops; and
      Wherein the back-and-forth movement of the electrified weight bearing vehicle along the track exerts a gravitational force on one end of the linear track such that the track rotates around the axle;
   A single chain having a left end and a right end;
      wherein the left end of the chain is affixed to the left distal side of the linear track, and the right end of the chain is affixed to the right distal side of the linear track;
   A minimum of two chain drive gears, each chain drive gear being coupled to at least one pinion gear;
      Wherein at least one chain drive gear is located on the left side of the apparatus and at least one chain drive gear is located on the right side of the apparatus; and
      Wherein the chain is connected to the inferior portion of the chain drive gears such that the motion of the chain rotates the chain drive gear;
   A minimum of two horizontal flat racks, each rack being affixed to at least one piston;
      Wherein at least one horizontal flat rack is located on the left side of the apparatus and at least one horizontal flat rack is located on the right side of the apparatus;
      Wherein when the gravitational pump apparatus is in motion each horizontal flat rack is connected to the inferior portion of the pinion gear such that the rack converts the rotational motion of the pinion gear into linear motion;
   A pre-filtered water reservoir comprised of a pre-filtered water inflow pipe, a minimum of two outlet pipes each comprising at least one inferior flap check valve, a pressure cylinder having at least one discharge pipe, having a superior flap check valve and a reverse osmosis membrane stack;
      wherein the flap check valves allow fluid to move in a distal direction from the pre-filtered water inflow into the pressure cylinder;
      wherein each pressure cylinder contains at least one piston;
      wherein when the gravity apparatus is in motion the piston alternates between creating pressure differentials and forcing fluid out of the chamber in the direction of the superior flap check valve and through a reverse osmosis membrane stack.

2. The apparatus of claim 1, wherein the upright support stanchion posts have stops affixed to either side of the superior portion of the stanchion posts, limiting the rotational movement of the linear track to a maximum decline angle.

3. The apparatus of claim 1, wherein the EV chassis is powered by one or more EV batteries.

4. The apparatus of claim 3, wherein the batteries are recharged using one or more solar PV panels coupled to the top of the EV chassis.

5. The apparatus of claim 1, wherein the back-and-forth movement of the EV chassis between the spring-loaded stops on the track allows the EV batteries to remain charged.

6. A method for desalination of fluid composing:
   using a pre-filtered water reservoir comprising, an inflow pipe, a minimum of two outlet pipes, and having a left and right side and containing saline fluid;
      wherein at least one outlet pipe is affixed to the left side of the reservoir, and
      wherein at least one outlet pipe is affixed to the right side of the reservoir; and
      wherein each outlet pipe further comprises an inferior flap check valve, a pressure cylinder, and a superior flap check valve; and a minimum of one reverse osmosis membrane stack; and
   utilizing the gravitational force of an electric weight bearing vehicle on one end of a linear track to rotate the linear track on an axel supported by one or more stanchion posts; and
      wherein the electric weight bearing vehicle further comprises an EV chassis, a battery, and a photovoltaic array; and
      wherein the photovoltaic array charges the battery; and
      wherein the battery sustains the movement of the electric weight bearing vehicle;
   using the motion of a chain attached to each end of the linear track to rotate a minimum of two chain drive gears coupled to a minimum of one pinion gear;
      wherein at least one chain drive gear is affixed to the left side of the linear track, and
   wherein at least one chain drive gear is affixed to the right side of the linear track; and
      wherein each pinion gear is connected to a flat rack such that the rotation of the pinion gear with the flat rack converts the rotational motion of the pinion gear into a linear motion of the flat rack; and
      wherein each flat rack is connected to a minimum of one piston, which is encircled by at least one pressure cylinder; and
   using the reciprocating motion of the left and right pistons to create pressure differentials in the pressure cylinders; and
      wherein the pressure differential draws the saline fluid from the pre-filtered water reservoir, through the inferior flap check valve, into the pressure cylinder, and through the superior flap check valve, to exit the apparatus through the reverse osmosis membrane stack; and wherein the flap check valves oscillate between an open and closed position dependent upon the pressure differential of the cylinder; and wherein fluid flowing towards the reverse osmosis membrane stack opens the flap check valve; and wherein fluid flowing away from the reverse osmosis membrane stack closes the flap check valve in a reciprocating motion.

7. The method of claim 6, wherein the upright support stanchion posts have stops affixed to either side of the superior portion of the stanchion posts, limiting the rotational movement of the linear track to a maximum decline angle.

8. The method of claim 6, wherein the EV chassis is powered by one or more EV batteries.

9. The method of claim 8, wherein the batteries are recharged using one or more solar PV panels coupled to the top of the EV chassis.

\* \* \* \* \*